UNITED STATES PATENT OFFICE.

EZRA FRED WOOD, OF MUNHALL, ASSIGNOR TO CARNEGIE, PHIPPS & COMPANY, LIMITED, OF PITTSBURG, PENNSYLVANIA.

PROCESS OF MANUFACTURING ALLOYS OF IRON OR STEEL AND NICKEL.

SPECIFICATION forming part of Letters Patent No. 476,913, dated June 14, 1892.

Application filed June 5, 1891. Serial No. 395,254. (No specimens.)

*To all whom it may concern:*

Be it known that I, EZRA FRED WOOD, of Munhall, in the county of Allegheny and State of Pennsylvania, have invented a new and useful Improvement in Processes of Manufacturing Alloys of Iron or Steel and Nickel, of which the following is a full, clear, and exact description.

My improvement in the manufacture of compounds or alloys of iron or steel and nickel concerns, chiefly, the method or means of introducing the nickel into the presence of the melted iron or steel and securing its admixture therewith; and it consists in effecting the reduction of oxide of nickel in the presence of the fused iron or steel to be alloyed or combined therewith either before or after the decarburization of the pig metal (when the open-hearth, basic, Bessemer, or other decarburizing process is employed) by mixing the oxide of nickel, either as natural ore or an artificial product of treatment of nickeliferous ores of other metals, with carbon in suitable proportions and exhibiting such mixture to the metal fused or in the process of fusion, so that the nickel ore may be reduced to a metallic condition in the presence of the metal with which it is to be alloyed, whether it be iron or steel or iron in the process of being converted into steel.

The nickel oxide used in my process may be any of the natural ores (oxides) of that metal or what is known as "artificial" nickel ore, which is preferable on account of the leanness of the natural ores. The oxide which I refer to as preferable is an article of commerce and has usually the following analysis, which is here given simply to serve as a description of the article referred to:

| | |
|---|---|
| Iron | 23.870 per cent. |
| Nickel | 48.230 per cent. |
| Phosphorus | 0.007 per cent. |
| Silica | 1.900 per cent. |
| Sulphur | 0.264 per cent. |
| Copper | trace |
| Oxygen and earthy matter | 25.729 per cent. |
| Total | 100. per cent. |

These proportions will of course vary in different specimens, and, excepting as to the nickel, are only material in ascertaining the proportion of such ore to be used with a given charge of iron or steel. This is true, also, of the natural ore.

My process is applicable to and may be carried into operation in connection with any of the known methods of making iron and steel from pig metal, as in the basic, open-hearth, or Bessemer processes, or in the crucible process of making cast-steel from wrought-iron. I prefer, however, either the open-hearth or the basic furnaces for conducting the process.

My improved process may be just the same as the process before mentioned as ordinarily employed in the manufacture of iron or steel, with the exception of the introduction of the nickel addition into the furnace in the manner invented by me, and which I will proceed to describe.

I prepare the nickel addition by grinding or otherwise pulverizing the nickel oxide before mentioned and mixing it in this condition with powdered charcoal, coke, or similar suitable carbonaceous matter in the proportions of about one part, by weight, of carbon with three parts, by weight, of pulverized nickel ore. If a lean natural ore is used, a smaller percentage of carbonaceous matter will be required, and if the proportion of nickel in the material used is greater or less than before mentioned the amount of carbonaceous matter should be correspondingly increased or diminished. The object of the carbon being to effect the reduction of the oxide of nickel, it will be understood, of course, that a suitable proportion of carbon should be added, the exact proportions being easily determined in practice. These ingredients (pulverized carbon and nickel oxide) being intimately mixed together are then formed into a plastic mass with a sufficient quantity of some binding material, such as tar or silicate of soda, and this plastic material is then formed into small masses, preferably bricks, which are compressed into a solid condition by any suitable means—such, for example, as a press similar to a brick-machine, operated by hydraulic pressure. The purpose of this pressure is to compact the materials, so that they can the more readily be kept immersed in the melted metal with which they are brought in contact. It is preferable to dry the ore before making into bricks, so as to render them more compact and to prevent the presence of water. The amount of oxide of nickel contained in these bricks can be readily determined by a previous analysis of the ore (natural or artificial) of which they are composed, and on the quantity of such bricks used with a given charge of metal will depend the percentage of nickel contained in the resulting product, which may vary in any desired degree, according to the character of the nickel-iron or nickel-steel to be manufactured, it being understood that in the use of my process an allowance should be made for the loss of about ten per cent. of metallic nickel which passes into the slag and is lost. The amount of this loss will, however, vary somewhat with the different processes of iron or steel manufacture in which it may be employed.

As I prefer to use my method in connection with the open-hearth process, I will first describe its practical application in that connection. The open-hearth furnace being first suitably heated, a proper proportion of nickel-addition bricks are placed on the hearth, mixed with the charge of pig metal, which is so placed as to prevent the bricks rising to the surface of the metal as it melts, after which the open-hearth process is carried on in the usual way, the decarburization of the pig metal and its subsequent recarburization, together with the addition of spiegeleisen or ferro-manganese, being conducted in the usual manner. The effect of introducing the nickel addition in the manner described is that the oxide of nickel is reduced in the presence of the melting or melted pig metal, and the metallic nickel thus produced becomes intimately mixed with the iron, while the earthy and foreign matter of the nickel ore is melted and unites with the slag. The result of the process thus conducted is the production of open-hearth steel having an admixture of metallic nickel, forming an alloy of steel and nickel, the relative percentages of which depend on the richness of the nickel ore employed in making the nickel-addition bricks and the proportion of such bricks introduced into the furnace with a given charge of metal.

My invention applies, also, to the use of the nickel addition in the basic process of decarburizing pig metal without any other change than the addition of the nickel bricks; and I find it preferable in the basic process to add these bricks after the addition of the limestone and before charging the pig-iron, so as to bring the nickel bricks into more intimate contact with the melting iron or steel.

When used in connection with the Bessemer process, I should prefer to introduce the nickel additions into the iron ladle as the molten pig metal is being charged into the converter, if the iron were hot enough at that stage of the process; but as this is usually not the case I find it better to introduce the nickel brick into the Bessemer converter before the molten iron is charged, no other change in the conduct of the Bessemer process being required; or the nickel bricks may be added to the Bessemer metal in the steel ladle at the end of the process, the steel being blown hot enough to cause the complete fusion of the bricks, in which case the nickel ore will be at once converted into metallic nickel and mingled with the liquid steel.

If my improvement is used in connection with the crucible process of making cast-steel from wrought-iron, I simply charge the nickel addition by placing the bricks, with the charge of wrought-iron and charcoal, into the crucible, after which the process is carried on to completion in the usual way.

What I claim as my invention, and desire to secure by Letters Patent, is—

1. The process of alloying nickel with iron and steel, consisting in charging bricks composed of nickel oxide and carbonaceous matter upon the hearth of a furnace, superimposing pig-iron thereon, and then heating the same, thereby causing reduction of the oxide and decarburization of the iron and producing an alloy of nickel and steel, substantially as and for the purposes described.

2. The process of alloying nickel with iron and steel, consisting in charging a layer of limestone into a basic furnace, superimposing a layer of bricks composed of nickel oxide and carbonaceous material, then charging in pig-iron, and heating the charge, thereby causing reduction of the oxide and decarburization of the iron and producing an alloy of nickel and steel, substantially as and for the purposes described.

In testimony whereof I have hereunto set my hand this 2d day of June, A. D. 1891.

EZRA FRED WOOD.

Witnesses:
W. B. CORWIN,
H. M. CORWIN.